United States Patent
Bonin et al.

(10) Patent No.: US 6,665,151 B1
(45) Date of Patent: Dec. 16, 2003

(54) FLEXIBLE TABS FOR IMPROVED MICROACTUATOR ASSEMBLY PROCESS

(75) Inventors: Wayne A. Bonin, North Oaks, MN (US); Zinne-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/517,923

(22) Filed: Mar. 3, 2000

Related U.S. Application Data

(60) Provisional application No. 60/158,598, filed on Oct. 8, 1999.

(51) Int. Cl.[7] ................................................ G11B 5/56
(52) U.S. Cl. .................................................. 360/294.3
(58) Field of Search .................... 360/294, 294.1–294.7

(56) References Cited

U.S. PATENT DOCUMENTS

| | | | |
|---|---|---|---|
| 5,711,063 A | | 1/1998 | Budde et al. |
| 6,078,473 A | * | 6/2000 | Crane et al. |
| 6,078,476 A | * | 6/2000 | Magee et al. |
| 6,198,606 B1 | * | 3/2001 | Boutaghou et al. ...... 360/294.3 |
| 6,351,354 B1 | * | 2/2002 | Bonin ..................... 360/294.6 |

OTHER PUBLICATIONS

*Batch Micropackaging By Compression– Bonded Wafer–Wafer Transfer*, Michel M. Maharbiz, Michael B. Cohn, Roger T. Howe, Roberto Horowitz, Albert P. Pisano, 1998.

*Batch Transfer Of Microstructures Using Flip–Chip Solder Bump Bonding*, Angad Singh, David A. Horsley, Michael B. Cohn, Albert P. Pisano, and Roger T. Howe, 1997.

* cited by examiner

*Primary Examiner*—Craig A. Renner
(74) *Attorney, Agent, or Firm*—Kinney & Lange, P.A.

(57) ABSTRACT

The present invention relates to a microactuator having a cavity into which a slider is inserted. Overhanging the cavity are flexible tabs, which are deformed once the slider is inserted. The tabs allow the slider to be aligned in the slider cavity. The tabs also create a mechanical and electrical connection between the slider and the microactuator.

20 Claims, 6 Drawing Sheets

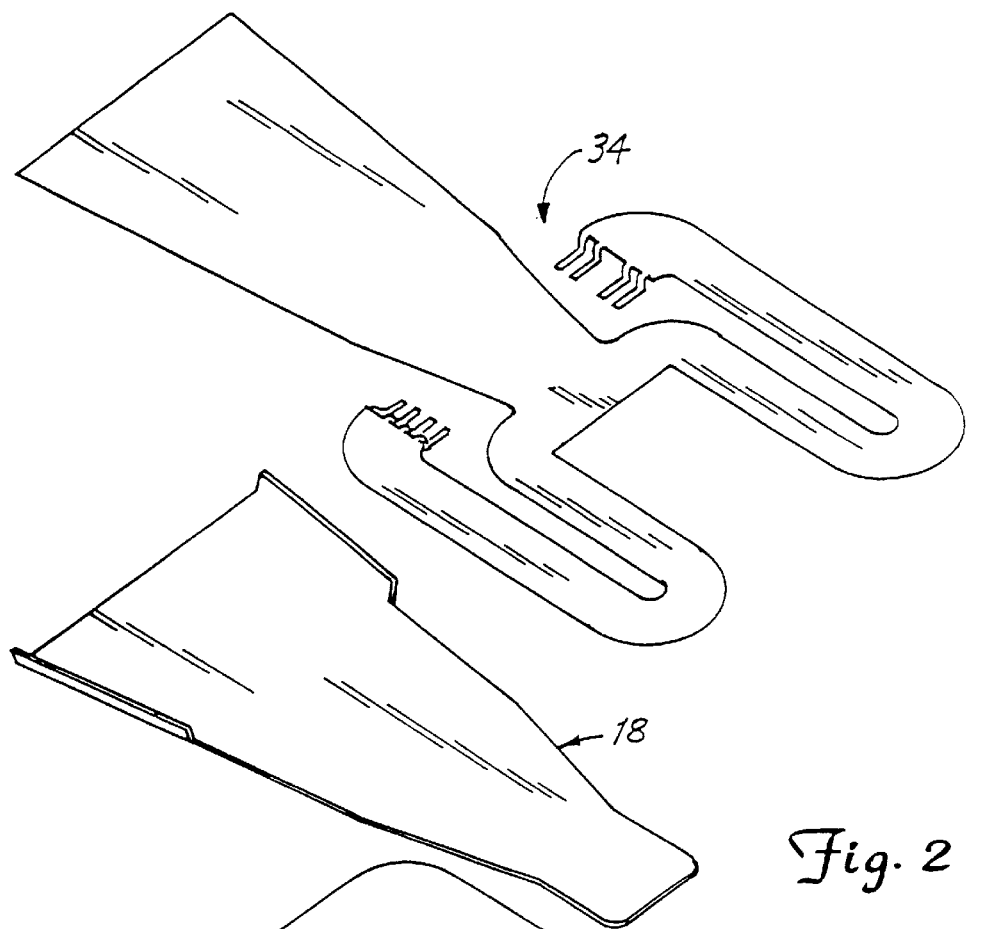
Fig. 2
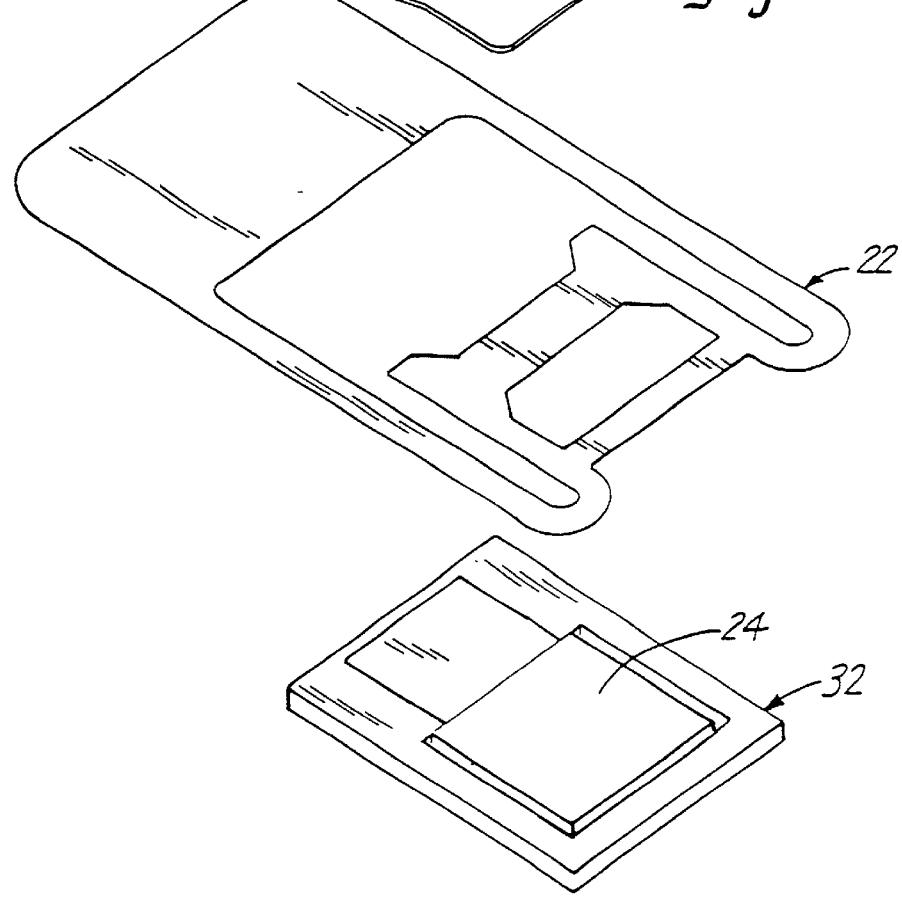

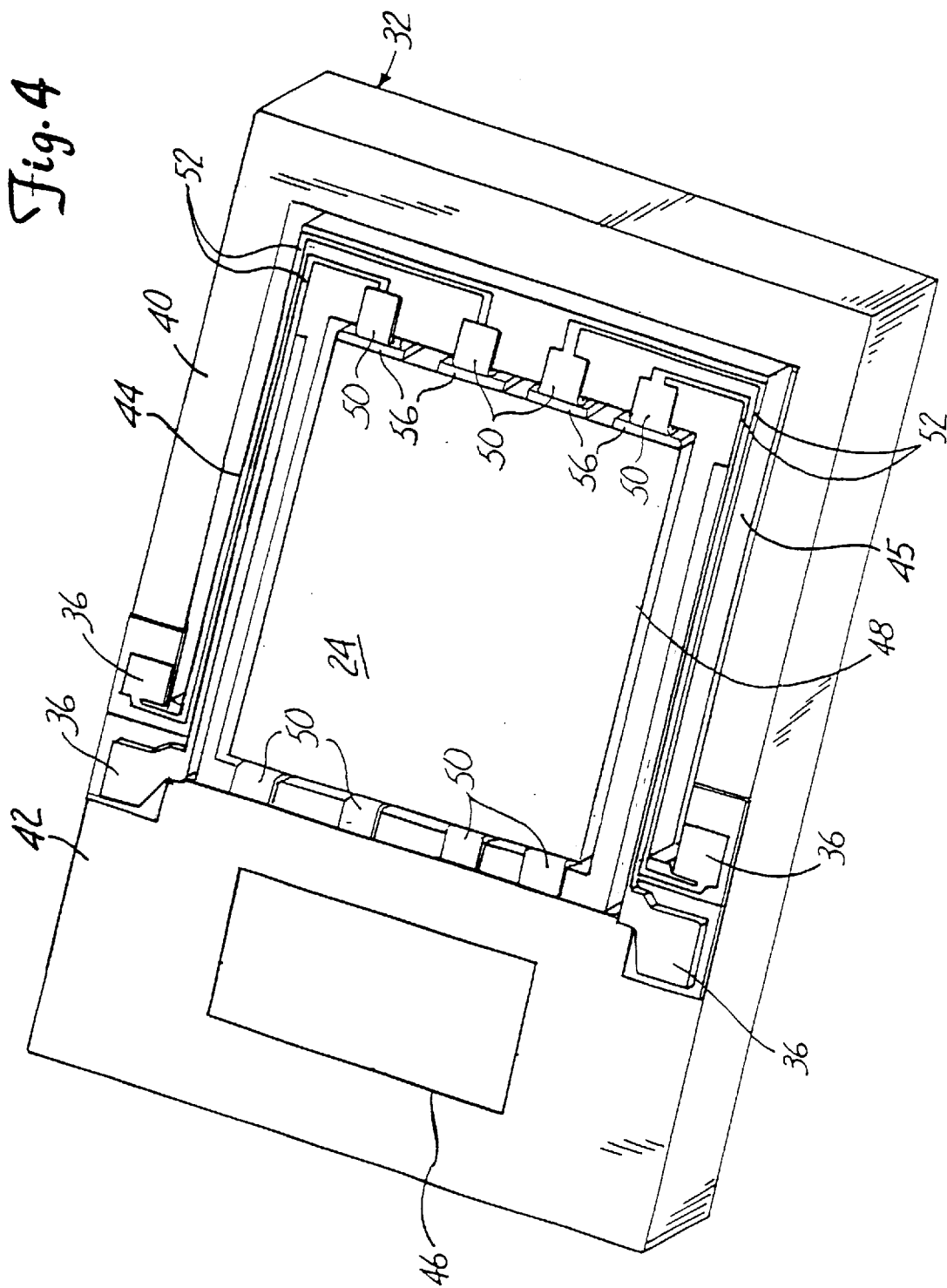

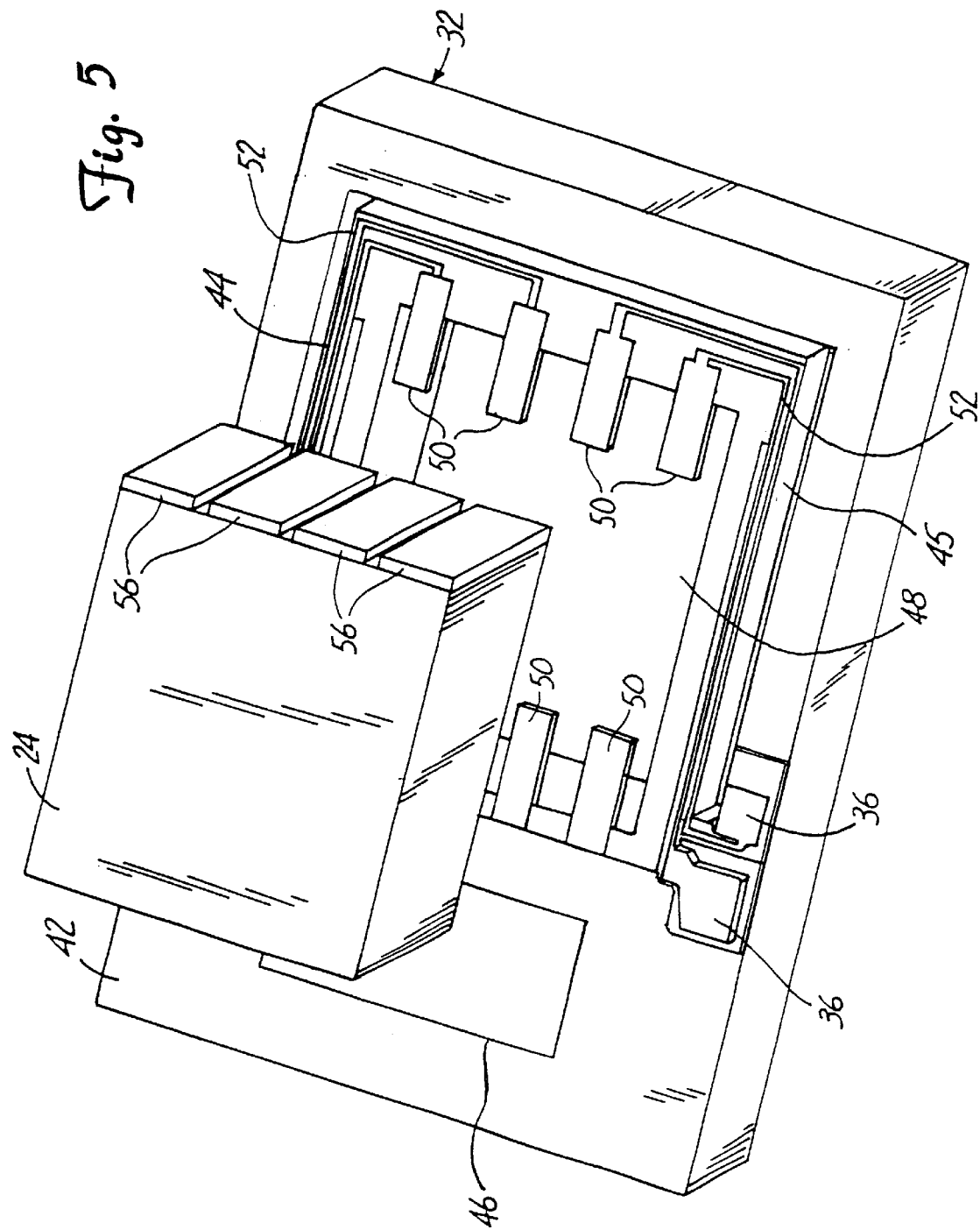

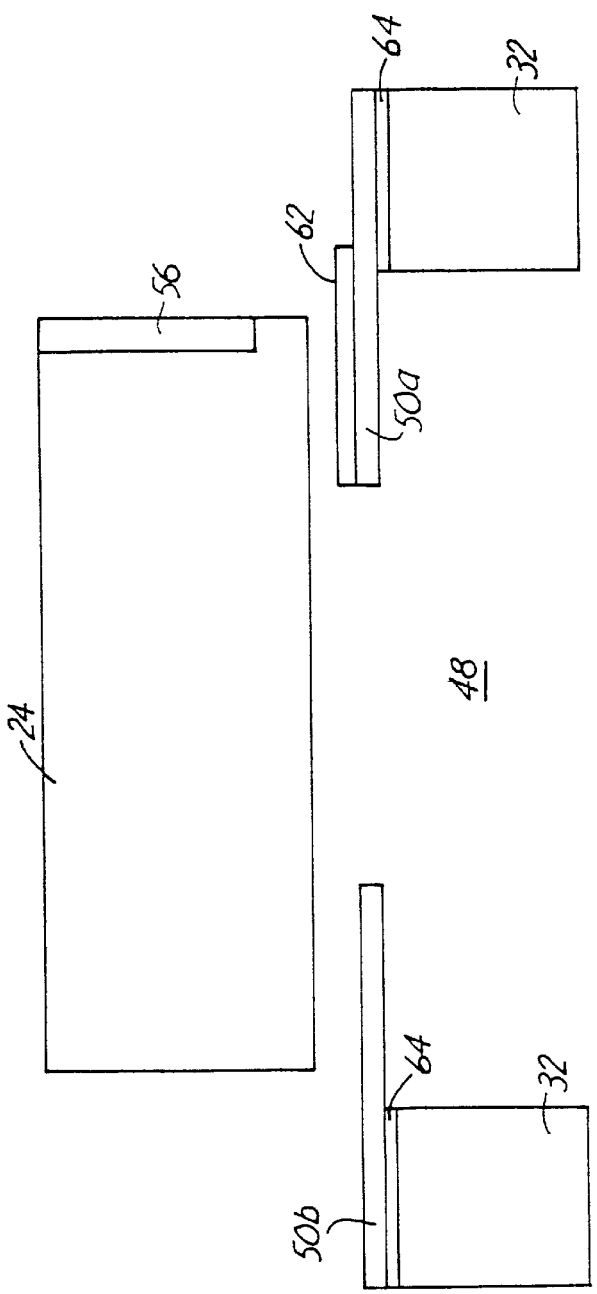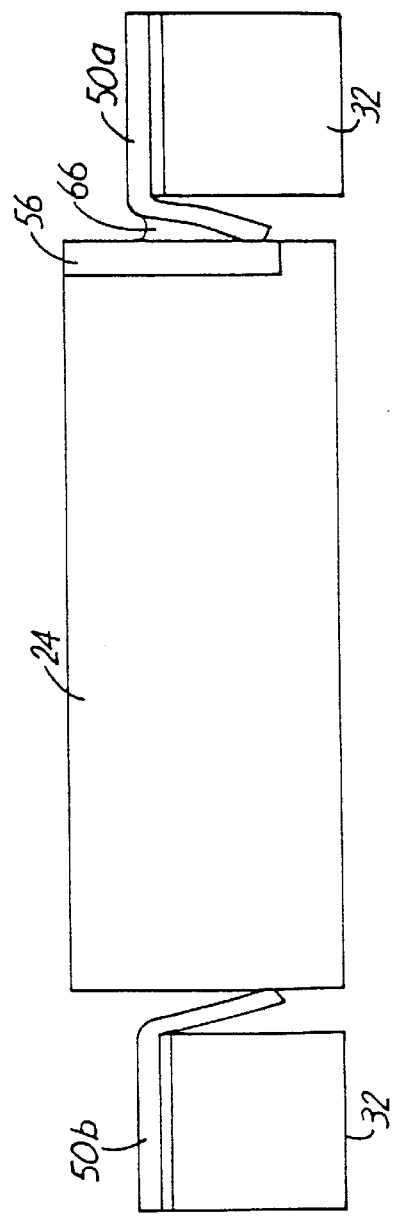

FLEXIBLE TABS FOR IMPROVED MICROACTUATOR ASSEMBLY PROCESS

CROSS-REFERENCE TO RELATED APPLICATION(S)

This application claims priority from Provisional Application No. 60/158,598 filed Oct. 8, 1999 for "FLEXIBLE TABS FOR IMPROVED MICROACTUATOR ASSEMBLY PROCESS" by Wayne A. Bonin and Zine-Eddine Boutaghou.

BACKGROUND OF THE INVENTION

The present invention relates to a disc drive microactuator system, and more particularly to an improved technique for electrically connecting a transducing head to a suspension flexure in the disc drive microactuator system.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. Mechanical assembly and electrical interconnection of head level microactuators requires accurate alignment of extremely small components. Current tool fixtures reference to the side of the slider, which adds the slider width tolerance to the positioning error when mounting the slider to the suspension. Referencing to the center of the part being aligned would be preferable, but would require entirely new tooling, at great cost.

In addition to alignment, problems with mechanically and electrically attaching the slider to the microactuator exist. If adhesives are used to bond the parts, a fixture must hold the parts in correct alignment until the adhesive cures, without the adhesive bonding the parts to the fixture. Current electrical interconnection technology (ultrasonic welding) requires that substantial forces be applied to the microactuator devices, which requires special support during welding to prevent breakage.

Further, the microactuator increases the complexity of manufacturing the head assembly because in addition to the electrical connections required between the head and suspension, electrical connections to the microactuator are also required. Electrical connections from the head bond pads to the microactuator rotor bond pads requires a third "interposer" lead frame, which is bonded first to the slider bond pads before slider/microactuator assembly, and then to the microactuator bond pads after assembly.

Thus, there is a need in the art for an improved interconnect between the slider and microactuator to alleviate the above-described deficiencies in the current state of technology.

BRIEF SUMMARY OF THE INVENTION

The present invention relates to connecting a slider to a microactuator. The microactuator has a slider cavity into which a slider is inserted. Overhanging the cavity are tabs made of a flexible material, such as metal, which are deformed as the slider is inserted into the cavity. The flexible tabs serve to align the slider in the slider cavity.

The flexible tabs also serve to create a mechanical connection between the slider and the microactuator. This mechanical connection may be strong enough to hold the slider permanently in place. Alternatively, the mechanical connection created by the deformed tabs may only serve to hold the slider in place during a more permanent bonding process. Finally, the flexible tabs may also be used to form an electrical connection between bond pads on the slider and traces on the microactuator. Solder may be used to affix the deformed tabs to the slider bond pads, creating a stronger mechanical connection and more reliable electrical connection.

BRIEF DESCRIPTION OF THE DRAWINGS

FIG. 2 is an exploded view of the portion of the disc drive actuation system implementing the microactuator and carrying the slider according to the present invention.

FIG. 4 is a perspective view of the microactuator frame electrically and mechanically interconnected to the slider according to the present invention.

FIG. 5 is an exploded perspective view illustrating the microactuator having flexible overhanging tabs and slider of the present invention.

FIG. 6 is a side view of a slider about to be positioned in the microactuator.

FIG. 7 is a side view of a slider incorporated into a microactuator and soldered into place.

DETAILED DESCRIPTION

Figure 1:
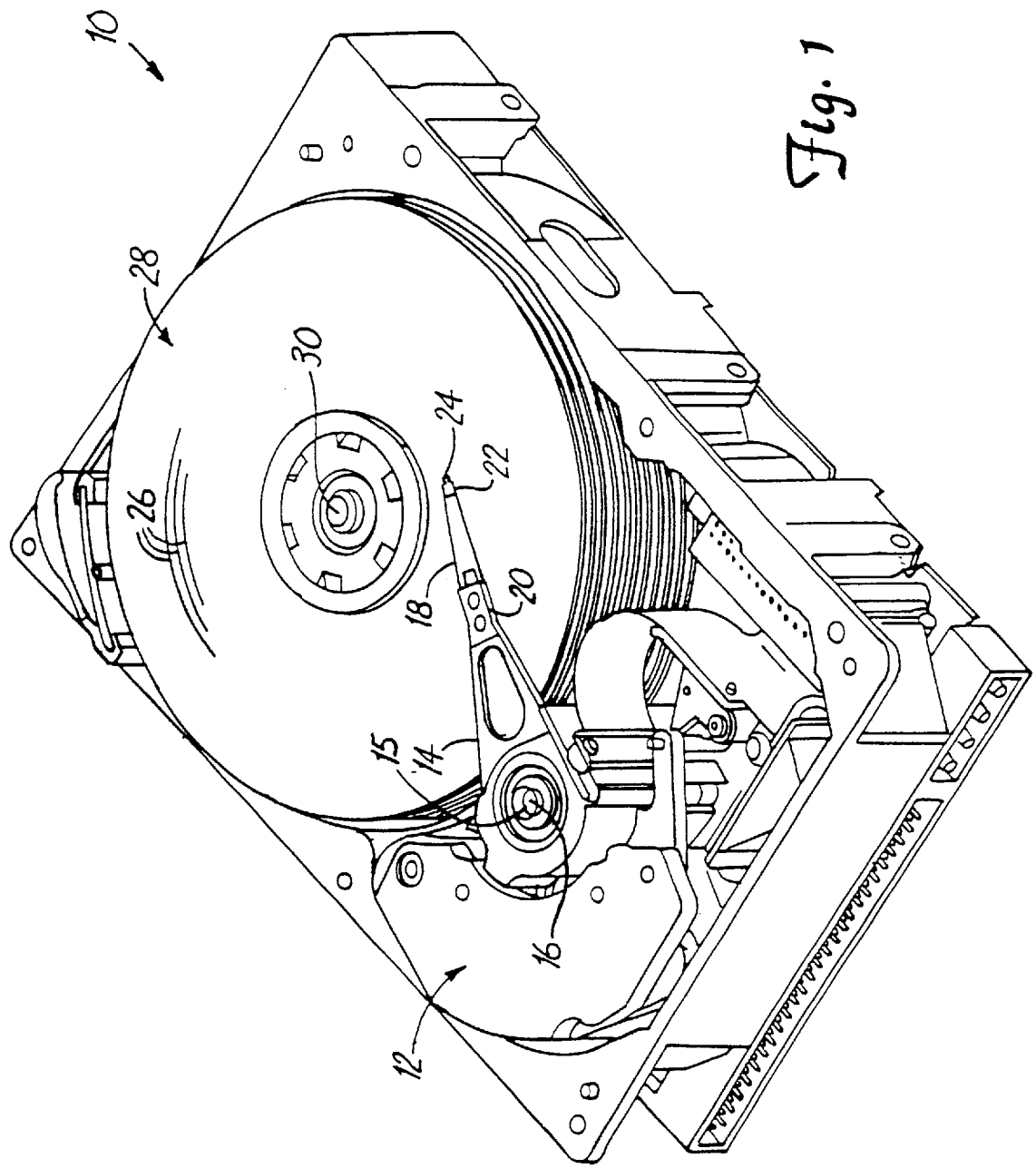
FIG. 1 is a perspective view of a disc drive actuation system for positioning a slider over tracks of a disc.

FIG. 1 is a perspective view of a disc drive 10 including a dual-stage disc drive actuation system for positioning a head-carrying slider over a track of disc. Disc drive 10 includes voice coil motor (VCM) 12 arranged to rotate actuator arm 14 on a spindle 15 around axis 16. Head suspension 18 is connected to actuator arm 16 at head mounting block 20. A microactuator is attached to load beam 18 by flexure 22 and carries slider 24, which in turn carries a transducing head for reading and/or writing data on concentric tracks 26 of disc 28. Disc 28 rotates around axis 30, so that windage is encountered by slider 24 to keep it aloft a small distance above the surface of disc 28.

VCM 12 is selectively operated to move actuator arm 16 around axis 14, thereby moving the transducing head carried by slider 24 between tracks 26 of disc 28. However, for disc drive systems with high track density, VCM 12 lacks sufficient resolution and frequency response to position the transducing head on slider 24 precisely over a selected track 26 of disc 28. Therefore, a higher resolution actuation device, such as a microactuator, is necessary.

FIG. 2 is an exploded view of the portion of the disc drive system implementing a microactuator and carrying a slider. Slider 24 is carried by microactuator 32, which is mechanically bonded to flexure 22 to carry the structure as it follows the contours of the disc surface. Load beam 18 bears through flexure 22 with a specified pre-load force onto microactuator 32, which is mechanically designed to transfer the pre-load force to slider 24 to maintain slider 24 proximate to the surface of the rotating disc during operation of the disc drive. A flex circuit 34 is provided to electrically interconnect the microactuator 32 and the transducing head or heads carried by slider 24 to control circuitry and preamplifier circuitry located remotely from the head assembly.

The microactuator 32 may be formed of a material such as silicon, with features formed by etching or a similar high resolution feature formation technique. Load beam 18 and flexure 22 are typically formed of stainless steel or a similar type of material, while flex circuit 34 may be formed of an appropriate substrate material such as polyimide. The slider 24 is typically made of a ceramic material and carries the transducing head or heads for reading data from and writing data to a disc. The transducing head or heads are typically embedded in the slider 24 in a manner known in the art, to avoid exposure to the elements on the outer surfaces of slider 24.

Figure 3:
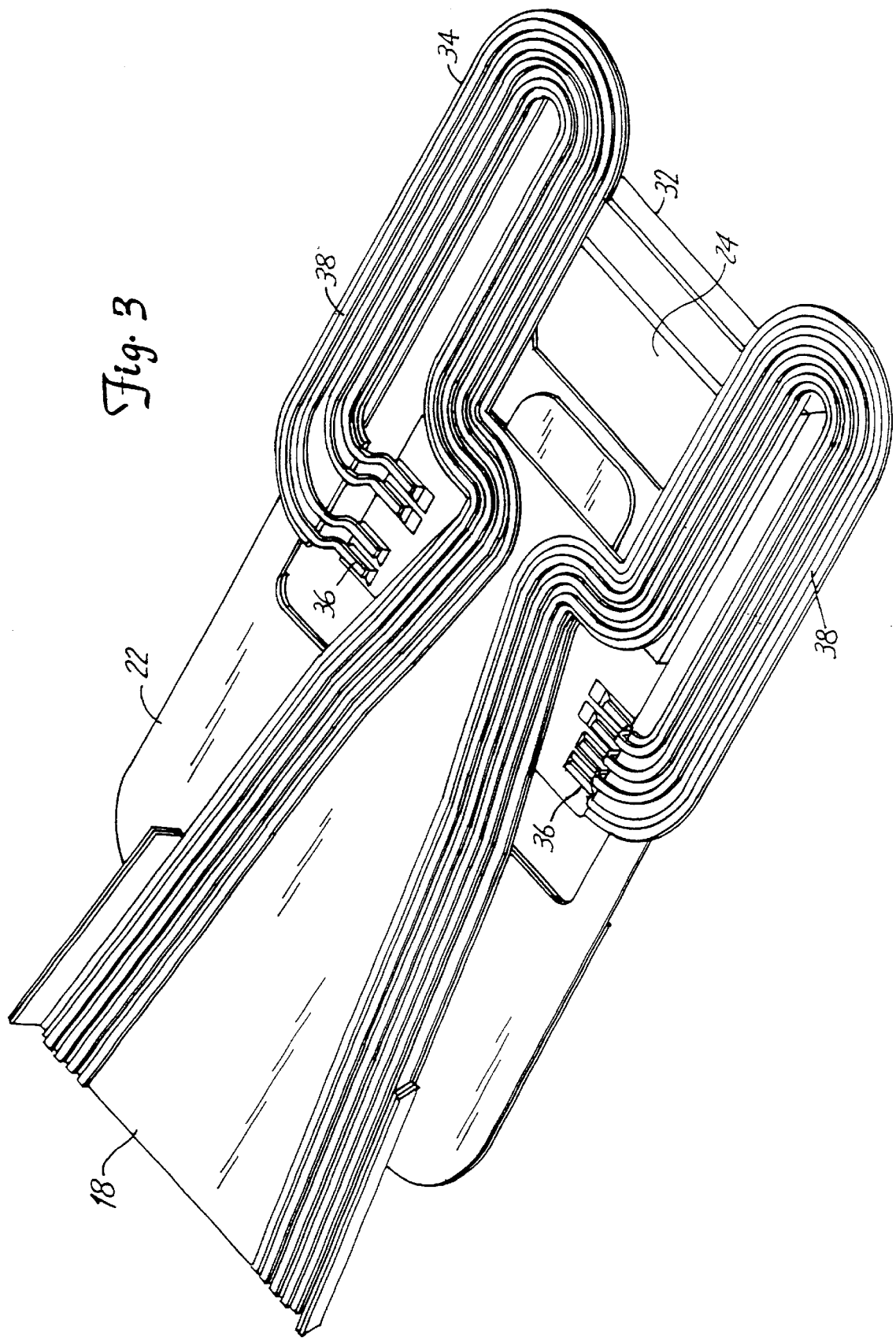
FIG. 3 is perspective view of the assembled portion of the disc drive system shown in FIG. 2.

FIG. 3 is a perspective view of the assembled head and flexure portion of the disc drive system shown in FIG. 2. Microactuator 32, which carries slider 24, includes conductive bond pads 36 providing access for electrical connection to the transducing head or heads carried by slider 24, and also to the microactuator motor itself to control movement of the microactuator 32. Flex circuit 34 includes conductive traces 38 for interconnection to bond pads 36. Bonding of traces 38 to bond pads 36 is achieved by ultrasonic lead bonding or a comparable attachment process known in the art.

Manufacturing microactuators 32 with sliders 24 has proved to be challenging due to the small size of the components involved. The slider 24 must be mechanically connected to the microactuator 32, and to allow the read/write signal to be sent to the bond pads 36, must likewise be electrically connected. In the past, a slider 24 was individually inserted into a microactuator 32. It is desirable to be able to fabricate several microactuators 32 and sliders 24 at one time. The present invention makes it possible to accurately mechanically and electrically connect sliders to microactuators at wafer level processing.

FIG. 4 is a perspective view of a portion of a microactuator illustrating the features of the present invention. Microactuator 32 essentially comprises an outer frame 40 which serves as the microactuator stator, and an inner frame 42, which serves as the microactuator rotor. Microactuator 32 further includes two beams 44, 45, a motor structure 46, a slider cavity 48, tabs 50, traces 52, and bond pads 36. The slider 24 has on its trailing edge bond pads 56. The slider 24 is inserted into the slider cavity 48 so that the slider bond pads 56 communicate with the tabs 50. The tabs 50 are connected to the traces 52. The traces 52 extend up the beams 44, 45 and end at the bond pads 36.

The motor structure 46 of the microactuator 32 is mechanically affixed to the rigid outer frame 40 of the microactuator 32. The motor structure 46 comprises magnets over which a coil structure (not shown in FIG. 4) is positioned. As a current runs through the coil, a magnetic field arises which causes a sideways force to be generated. This sideways force bends the beams 44, 45 of the microactuator 32 from side to side, thus deflecting the slider 24. In this manner, the microactuator 32 allows the transducing head or heads in slider 24 to more closely follow a data track on a disc.

As described above, the microactuator 32 is attached to the load beam 18 which applies a preloaded force to the slider 24. This load force controls the flying characteristics of the slider 24, and it is desirable to apply the load force at the center of the slider 24. If the load force is applied off center, it will affect the flight of the slider 24 and may cause one edge of the slider 24 to fly closer to the surface of the disk, which is undesirable. Aligning the slider 24 in the slider cavity 48 ensures the position of the slider 24 will be consistent from device to device, even if the width of the cavity 48 varies slightly or the width of the slider 24 varies slightly due to manufacturing tolerances. Consistency in the slider 24 positioning will ensure a more accurate flight of the slider. The tabs 50 may be used to center the slider 24 in the cavity 48, or align the slider 24 to one edge of the cavity 48.

The tabs 50 may serve not only to more precisely align the slider 24 in the cavity 48, but also may serve to mechanically hold the slider 24 in the microactuator 32. If the tabs 50 are to serve as a mechanical connection, the tabs 50 should preferably be formed of a relatively strong material so that they can hold the slider 24 in place by friction alone. Suitable stronger materials may be a beryllium copper alloy or stainless steel. The tabs 50 may further be gold plated to provide a reliable electric connection between the slider bond pads 56 and the microactuator 32.

If the tabs 50 are constructed out of a relatively soft material, such as aluminum or copper, the tabs 50 will generally not provide enough of a clamping force to reliably hold the slider 24 in place during operation, but would serve only to mechanically position the slider 24 in the slider cavity 48. However, it may be possible achieve the necessary clamping force required to form a mechanical connection using flexible tabs 50 formed from a relatively soft metal if the thickness of the tabs is increased. Using thicker, soft metal tabs results in the tabs experiencing more deformation when a slider is inserted. The softer metal is forced to flow sideways along the side of the microactuator 32 to allow the slider 24 to fit into the cavity 48, creating a stronger mechanical connection between the slider 24 and microactuator 32.

Tabs 50 made of a relatively soft material may also be used to hold the slider 24 in place during a bonding process which more permanently attaches the slider 24 to the microactuator 32. For instance, the slider 24 may be adhesively attached to the microactuator 32. In such an instance, the tabs 50 may be serve to hold the slider 24 in place during application and cure of the adhesive.

Once the slider 24 is positioned in the slider cavity 48 on the microactuator 32, the tabs 50 further serve to form an electrical interconnection between the slider 24 and the remote circuitry. The transducing head on slider 24 is electrically contacted by bond pads 56 on the trailing edge surface of the slider 24. Tabs 50 form an electrical interconnection between the bond pads 56 on the slider 24 and the traces 52 on the microactuator 32. From the transducing head on the slider 24, a read/write signal can be sent from the slider 24 using the interconnections formed at bond pads 56 and tabs 50. From tabs 50, the traces 52 on microactuator 32 take the read/write signal to the bond pads 36 on the stationary part of the microactuator 32. From bond pads 36, the signal is sent to traces 38 on flex circuit 42 (shown in FIG. 3), which is electrically interconnected to control circuitry and preamplifier circuitry located remotely from the head assembly. Thus, tabs 50 form an electrical connection between the slider 24 and the head suspension 18.

It is also possible to create an electrical connection between the slider 24 and the microactuator 32 by applying solder to a surface of the tabs 50. Once the slider 24 has been inserted into the microactuator 32 and the tabs 50 have been deflected, it is possible to reflow the solder to form an electrical interconnection between the bond pads 56 on the slider 24 and the tabs 50. Reflowing the solder can be done in an oven, or using laser reflow soldering to more localized heat at the solder joints, thus allowing a higher melting temperature solder to be used without the heat affecting the read/write element in the slider 24.

An epoxy or similar adhesive could be applied to the side of the slider 24 opposite that having the bond pads 56 to ensure a reliable mechanical connection between the slider 24 and the microactuator 32. In addition, the slider 24 may have tabs 50 on both sides. Furthermore, both sets of tabs 50 can be coated with a solderable material so that the same solder process as used for the electrical interconnection could be used for a mechanical connection as well.

Because silicon is somewhat conductive, the microactuator 32 may have an insulation layer covering its surface to electrically isolate the traces 38 from the silicon forming the microactuator 32. One way to create this insulation layer is to grow an oxide on the silicon by baking the silicon wafer from which the microactuators are formed at a high temperature in an oxygen or water vapor atmosphere. Other possible insulators include a photoresist, a polyimide, silicon nitride, or other oxides. It is desirable for the insulation layer to be somewhat flexible to prevent any cracking in the insulation layer as the microactuator 32 deflects. The tabs 50 and traces 52 are then formed or adhered on top of this insulation layer.

FIG. 5 is an exploded perspective view of the microactuator 32 and slider 24 before the slider 24 is inserted into the slider cavity 48 of microactuator 32. More clearly visible on the slider are the slider bond pads 56. Also shown on the microactuator 32 are the tabs 50 as they appear before the slider 24 is inserted into cavity 48. The tabs 50 overhang the cavity 48. To assemble, the slider 24 is inserted into cavity 48 using a downward force to deflect the tabs 50. Once inserted, the bond pads 56 on slider 24 meet the now deflected tabs 50 on the microactuator 32. To allow the tabs 50 to deflect once the slider is inserted, the tabs 50 are preferably formed of a material which can be deflected or deformed without experiencing breakage, such as a metal.

When manufacturing a microactuator having such flexible overhanging tabs, the tabs 50 can be fabricated by depositing and patterning a layer of metal on one side of the microactuator wafer. If so deposited, a structural through etch from the opposite side is performed to form the microactuator 32 and leave the tabs 50 exposed.

Another method for depositing the metal tabs 50 on the microactuator 32 is to use a vacuum deposition process or an electroplating process. If the tabs 50 are required to have a substantial thickness of more than several microns, it may be more preferable to apply a thin layer of the tab material by sputtering or using evaporation. Once the thin layer is applied, electroplating can be used to build up the tabs to the full thickness over the entire wafer. An etching process can then be used to etch away the material not required, leaving the tabs. Alternately, it is possible to apply a very thin layer of material over the entire wafer and next apply a photoresist mask. The mask is a pattern which allows the material to plate up in its openings or where the photoresist mask is not. The photoresist mask is removed after the tabs are formed and it is necessary to perform only a short etch over the thin layer under the mask to remove it.

Yet another alternative is to fabricate the tabs 50 separately from the microactuator wafer. More specifically, it is possible to use a sheet of metal foil and an etching process to create the tabs. The etched metal foil can then be adhesively bonded to the microactuator wafer using an adhesive or bonding process. Adhesively attaching the tabs 50 may be more desirable when using higher strength materials in an effort to mechanically hold the slider 24 in the microactuator 32 using only the friction created by the deformed tabs 50. This is because the higher strength metals are generally not as easy to electroplate or deposit on the microactuator 32.

FIGS. 6 and 7 illustrate the process of inserting a slider 24 into a microactuator 32 having flexible overhanging tabs 50. FIG. 6 is a greatly enlarged side view of the slider 24 just prior to its insertion into the microactuator 32. Visible in FIG. 6 are the tabs 50a, 50b which overhang the slider cavity 48 of the microactuator 32. The metal tabs 50a on the right hand side of the microactuator 32 (when viewed in FIG. 6) have a layer of solder 62 plated on them, and an insulation layer 64 can be seen between the tabs 50 and the surface of the microactuator 32. The metal tabs 50b on the left hand side of the microactuator 32 have no solder layer. Visible on the slider 24 are the slider bond pads 56.

As described above, the plated solder 62 on tabs 50a aids in forming an electrical connection between the bond pads 56 of the slider 24 and the traces 52 on the microactuator 32. This electrical connection allows a read/write signal to pass from the slider 24 to the traces 52 located on the microactuator. Though no electrical connection is required between the tabs 50b and the slider, a mechanical connection is still required to ensure the slider 24 is properly attached to the microactuator 32.

FIG. 7 is a side view of the slider 24 once it is inserted into the microactuator 32. As can be seen, the metal tabs 50a, 50b have been deflected downward after the slider 24 has been forced into the cavity 48. On the right hand side (as viewed in FIG. 7), the solder layer has been reflowed to create a solder joint 66 between the slider 24 and metal tab 50a. This solder joint 66 forms both a mechanical and an electrical connection between the bond pads 56 on the slider 24 and the microactuator 32. Because no solder was applied on the tab located on left hand side of the slider 24, it can be seen that though the metal tab 50b is deflected, no solder joint has been formed. As described above, an adhesive may be used on the left hand side to form the necessary mechanical connection between the slider 24 and the microactuator 32.

The sliders 24 may be inserted into the microactuators 32 while the microactuators are at the wafer level. This would allow hundreds or thousands of microactuators to be formed at once using the wafer process. In the past, incorporating the slider into the microactuator structure was done on an individual slider level. Thus, it was extremely expensive and time-consuming to manufacture such microactuators. The present invention allows several microactuators to be formed at a time using wafer level processing. At the same time, the tabs 50 serve to precisely align the slider in the slider cavity, and can further function to form the required electrical connection between the slider and the microactuator.

To ensure that the microactuator 32 is not broken as the slider 24 is inserted, it may be desirable to place the microactuators 32 on a flat surface while the sliders are inserted. The flat surface is helpful to prevent breakage of the microactuators 32. If the surface is not completely flat and the slider 24 is forced into the aperture, the microactuator 32 may break at the point where the surface is uneven. Further, the slider 24 can be forced downward and deflect tabs until the slider 24 bottoms out on the flat surface, thus ensuring the slider 24 is inserted into the microactuator to the proper depth.

The same concept of using flexible overhanging tabs may be used when inserting the motor structures 46 into the microactuators 32. Because the motor structures are self-contained and do not require any electrical connections, it is not necessary to apply a solder level or an insulation layer to the tabs. Alternatively, the motor structure 44 may be fabricated as part of the microactuator 32.

Although the present invention has been described with reference to preferred embodiments, workers skilled in the art will recognize that changes may be made in form and detail without departing from the spirit and scope of the invention.

What is claimed is:

1. A microactuator for positioning a head carrying slider above a rotating disc, the microactuator comprising:
    a slider cavity for receiving the slider;
    flexible tabs on opposing sides of the slider cavity holding the slider in the slider cavity by a clamping force.

2. The microactuator of claim 1 and further comprising bond pads on the slider positioned so that when the slider is inserted into the slider cavity and the flexible tabs are deformed, the flexible tabs communicate with the slider bond pads.

3. The microactuator of claim 2 and further comprising a solder joint between the flexible tabs and the slider bond pads.

4. The microactuator of claim 1 wherein the flexible tabs are formed of a metal.

5. The microactuator of claim 1 herein the flexible tabs are further configured to align the slider in the slider cavity when the slider is inserted into the slider cavity.

6. The microactuator of claim 1 and further comprising an insulation layer between the flexible tabs and a body of the microactuator.

7. The microactuator of claim 1 wherein the clamping force is created by inserting the slider into the slider cavity and deforming the flexible tabs between the slider and slider cavity.

8. A disc drive actuation system for positioning a head carrying slider over a track of a rotating disc, the actuation system comprising:
    a microactuator with a slider cavity for receiving the slider; and
    flexible tab means on opposing sides of the slider cavity of the microactuator for connecting the slider to the microactuator by deforming into the slider cavity when the slider is inserted into the slider cavity and holding the slider in the slider cavity.

9. The disc drive actuation system of claim 1 wherein the flexible tab means further function to align the slider in the slider cavity.

10. The disc drive actuation system of claim 1 and further comprising a solder joint connecting the flexible tab means and the slider.

11. The disc drive actuation system of claim 1 and further comprising an insulation layer between the flexible tab means and the microactuator.

12. The disc drive actuation system of claim 1 wherein the flexible tab means are formed of a metal.

13. The disc drive actuation system of claim 1 wherein the flexible tab means forms an electrical connection between the slider and the microactuator.

14. A disc drive actuation system for positioning a transducing head over a track of a disc, the actuation system comprising:
    a slider for carrying the transducing head; and
    a microactuator, the microactuator comprising:
        a slider cavity for receiving the slider; and
        flexible tabs on opposing sides of the slider cavity of the microactuator deformed between the slider and the slider cavity and aligning the slider in the slider cavity.

15. The disc drive actuation system of claim 14 wherein the flexible tabs are further configured to mechanically connect the slider to the microactuator.

16. The disc drive actuation system of claim 14 and further comprising bond pads on the slider positioned so that when the slider is inserted into the slider cavity, the deformed flexible tabs communicate with the slider bond pads.

17. The disc drive actuation system of claim 16 and further comprising traces on the microactuator connected to the flexible tabs and which terminate in bond pads on the microactuator.

18. The disc drive actuation system of claim 17 wherein the flexible tabs are further configured to allow for an electrical connection between the slider and the microactuator.

19. The disc drive actuation system of claim 14 wherein the flexible tabs are formed of a metal.

20. The disc drive actuation system of claim 19 and further comprising a solder joint connecting the flexible tabs and the slider.

* * * * *

UNITED STATES PATENT AND TRADEMARK OFFICE
CERTIFICATE OF CORRECTION

PATENT NO. : 6,665,151 B1  Page 1 of 1
DATED : December 16, 2003
INVENTOR(S) : Wayne A. Bonin et al.

It is certified that error appears in the above-identified patent and that said Letters Patent is hereby corrected as shown below:

Column 7,
Line 29, delete "herein" and insert -- wherein --

Signed and Sealed this

Twenty-third Day of March, 2004

JON W. DUDAS
*Acting Director of the United States Patent and Trademark Office*